May 2, 1967     J. A. M. LECLERCQ     3,317,163
AIRCRAFT RETRACTABLE LANDING GEARS

Filed July 19, 1965     2 Sheets-Sheet 1

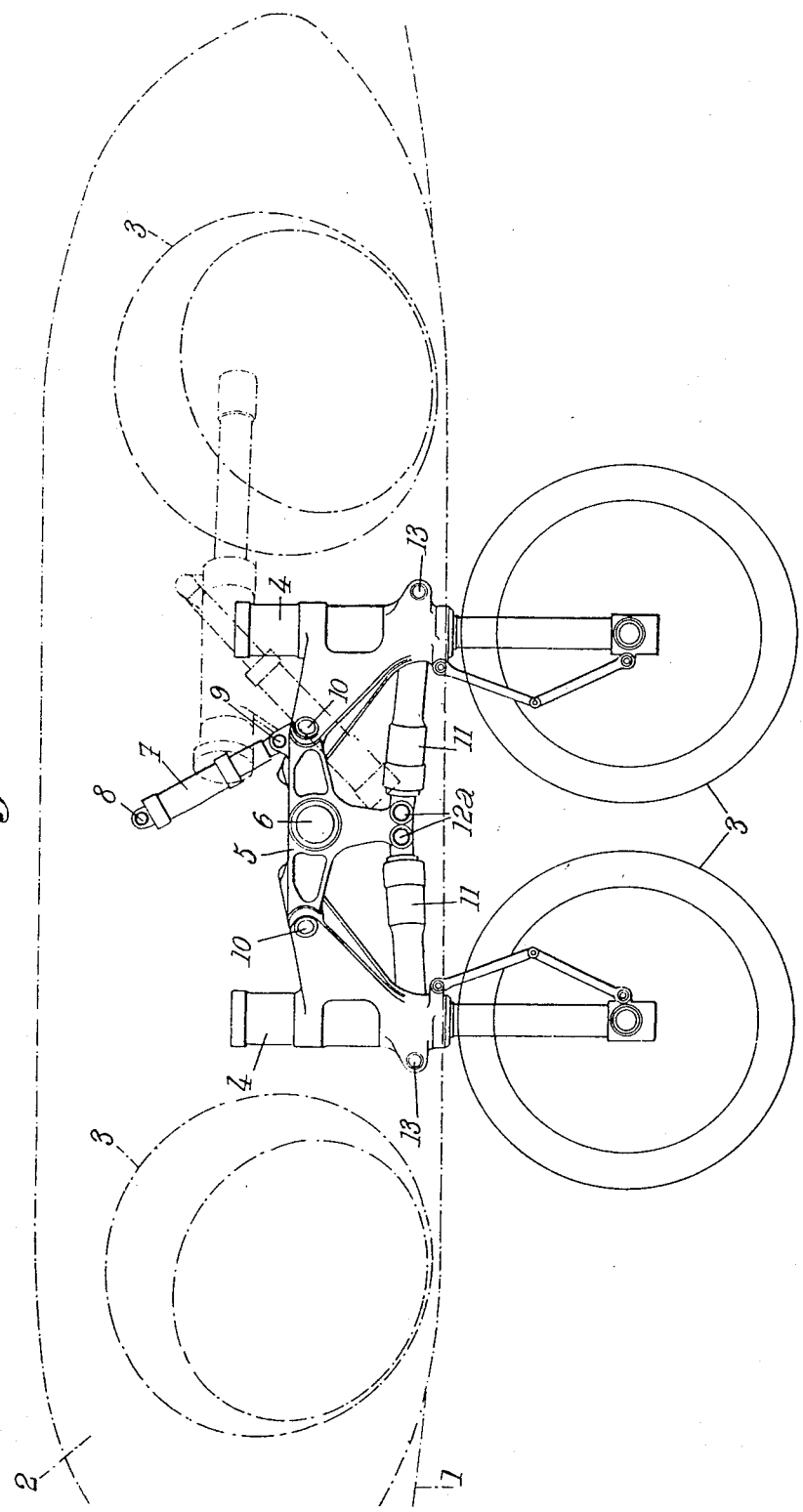

United States Patent Office 3,317,163
Patented May 2, 1967

3,317,163
AIRCRAFT RETRACTABLE LANDING GEARS
Jacques Andre Maurice Leclercq, Saint-Leu-la-Foret, France, assignor to Societe d'Exploitation des Materiels Hispano-Suiza, Bois-Colombes, Seine, France
Filed July 19, 1965, Ser. No. 472,854
Claims priority, application France, July 23, 1964, 982,809
14 Claims. (Cl. 244—102)

The present invention relates to aircraft retractable landing gears including two wheels disposed behind each other in the longitudinal direction, that is to say in tandem-like fashion, carried by a common support oscillable with respect to the aircraft about a transverse axis, against the action of shock absorbing means, so as to permit contact of said two wheels with the ground for different inclinations of the fore-and-aft axis of the aircraft with respect to the ground, the invention being more especially intended for freight carrying airplanes.

Its object is to provide a landing gear of this kind which is better adapted to meet the requirements of practice, in particular concerning the facility of retracting the wheels.

The invention consists chiefly, on the one hand, in having the two wheels carried by two respective legs, preferably resilient, pivoted about different respective axes on a common support oscillable, against the action of shock absorbing means, with respect to the cell of the aircraft, the articulation of said legs on their common support being blocked by suitable locking means when the landing gear is expanded, and, on the other hand, in order to permit retraction of said gear, control means for lifting the two legs, previously unlocked, by pivoting thereof about their respective pivot axes on the common support.

A preferred embodiment of the present invention will be hereinafter described with reference to the appended drawings, given merely by way of example, and in which:

FIG. 3 is a longitudinal elevational view on a larger scale of a landing gear of the same kind as that of FIGS. 1 and 2, shown in expanded position.

It will be supposed that the landing gear comprises, on either side of the aircraft fuselage, two symmetrical nacelles 2 in each of which a landing gear unit is to be retracted by a movement taking place, at least approximately, in a plane parallel to the fore-and-aft axis of the aircraft.

Figure 1:
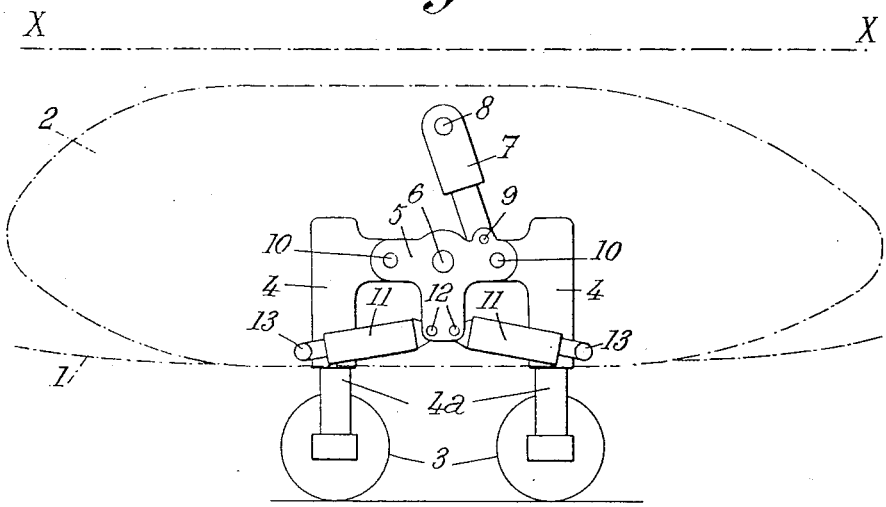
FIG. 1 is a diagrammatic longitudinal view of a landing gear made according ot the present invention.

Each landing gear unit comprises, as diagrammatically shown by FIG. 1, two wheels 3 disposed in tandem-like fashion and carried by two legs 4, respectively, said legs being provided with shock absorbers 4a incorporated therein. Said legs are pivotally mounted, about respective transverse axes 10, on a common support 5 oscillable with respect to fuselage 1 about an axis 6 transverse to the longitudinal middle plane of the aircraft. Shock absorbing means 7 are interposed between an axis 8 carried by the aircraft structure and an axis 9 carried by support 5.

According to the present invention, every leg 4 of the landing gear is pivoted to support 5 about an axis 10 perpendicular to the longitudinal axis XX of the aircraft, pivot axes 10 being at a distance from each other and, for instance, symmetrically disposed with respect to the axis 6 about which support 5 is oscillable with respect to the aircraft fixed structure. Advantageously said axes 10 are at the same level as axis 6.

Furthermore control means are provided to permit of pivoting legs 4 about axes 10 respectively, said control means consisting advantageously of two hydraulic motors 11 pivoted at one end, at 12, to support 5, and, at the other end, at 13, to the corresponding leg 4.

Finally, each leg 4 is provided with locking means capable of preventing said leg from pivoting with respect to support 5 when the landing gear is in the expanded position shown by FIG. 1. Such locking means may be constituted advantageously by the hydraulic motors 11 which must be of the type which can be locked in the retracted position illustrated by FIG. 1.

Figure 2:
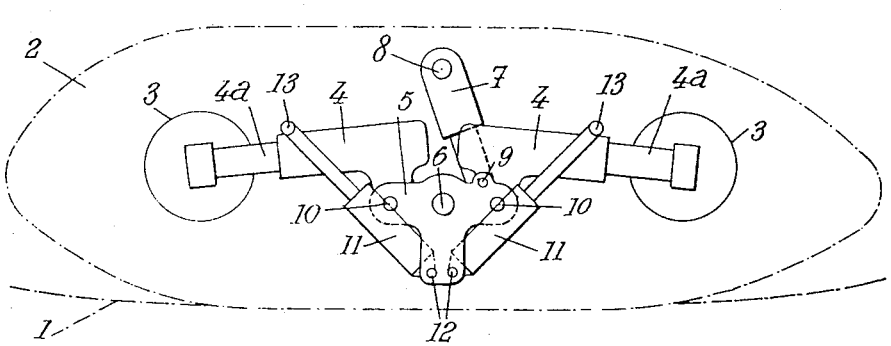
FIG. 2 shows the same landing gear in retracted position.

It should be noted that I may also provide means for locking the landing gear in the retracted position illustrated by FIG. 2. Said last mentioned locking means may consist of hydraulic motors 11, provided that they can be locked in the position thereof where the legs 4 of the landing gear are retracted into nacelle 2, as shown by FIG. 2.

As it will be readily understood, when the landing gear is expanded (position of FIG. 1), it forms a system oscillable about axis 6 against the action of shock absorbing means 7. Such an arrangement enables the landing gear to occupy with respect to the airplane cell the best position for a good distribution of the loads between the two units of the landing gear under different working positions (landing, running on the ground, taking off).

During the landing gear retracting and expanding operations, only a limited number of movable pieces is brought into play so that the whole may be strong and reliable.

When in retracted position the landing gear is a minimum head resistance.

It should be noted that such a landing gear might be completed by additional control means, in particular retraction and/or wheel pivoting control means, capable of ensuring, when the landing gear is retracted, a shortening of the structure constituted by a leg 4, its shock absorbing device 4a and the wheel 3 carried by said shock absorbing device, and/or a pivoting of the wheel, such additional control means being conventional.

On the other hand, with a landing gear according to the present invention, it is possible, in a very simple manner, to give each wheel 3, during its retracting displacement, a movement of rotation with respect to the corresponding leg 4 in order to facilitate retraction and/or penetration of said wheel in its housing, or again in order to apply the wheel more tightly against the fuselage of the aircraft.

For this purpose, it suffices to incline each axis 10 with respect to the transverse direction that is to say with respect to the direction perpendicular to the longitudinal plane of symmetry of the aircraft.

For instance it is possible, as illustrated by FIG. 3, to dispose the pivot axes 10 substantially horizontal and convergent toward each other whereas, in the construction of FIGS. 1 and 2 said axes were both horizontal and parallel to the transverse direction.

It should be noted that, in the case of FIG. 3, the axes and articulations of retracting hydraulic motors 10 with respect to oscillable support 5 should be articulations 12a of the swivel or Cardan type.

In general manner, while I have in the above description disclosed what I deem to be a practical and efficient embodiment of the present invention, it should be well understood that I do not wish to be limited thereto as there might be changes made in the arrangement, disposition and form of the parts without departing from the principle of the present invention as comprehended within the scope of the appended claims.

What I claim is:

1. For use on an aircraft structure, a landing gear which comprises; a support pivoted to said aircraft structure about a single first axis, said first axis being tranverse to the aircraft fore-and-aft direction, a first leg pivoted to said support about one second axis transverse to the aircraft fore-and-aft direction and a second leg pivoted to said support about another second axis, each of said second axes being the sole axis about which its corresponding leg is pivoted to said support, a first wheel journalled on said first leg about one third axis and a second wheel journalled on said second leg about another third axis, each of said third axes being at a fixed angular relationship with respect to its corresponding leg, and each of said third axes being horizontal and perpendicular to said fore-and-aft direction when said legs are in the downwardly extended position with respect to said support, and an actuating means interposed between each leg and said support for causing said respective leg to pivot upwardly about its respective second axis with respect to the said support.

2. A landing gear as claimed in claim 1 including a shock absorbing means positioned between a point of said aircraft structure and a point of said support at a distance from said first axis, and a locking means for locking the said legs in the downwardly extended position.

3. A landing gear as claimed in claim 1 wherein said second axes lie in horizontal planes and including a locking means for locking the legs in the said downwardly extended position.

4. A landing gear as claimed in claim 3 wherein the said two second axes are parallel to the first axis.

5. A landing gear as claimed in claim 3 wherein the said two axes are slightly convergent relative to each other.

6. A landing gear as claimed in claim 3 wherein the said first axis lies in a horizontal plane.

7. A landing gear as claimed in claim 6 wherein each of said second axes lie in the same horizontal plane as the first axis.

8. A landing gear as claimed in claim 3 including a shock absorbing means mounted between a point of said aircraft structure and a point of said support at a distance from said first axis.

9. A landing gear as claimed in claim 8 including a locking means for locking the legs in the downwardly extended position and including shock absorbing means mounted in said legs.

10. A landing gear as claimed in claim 9 wherein the two second axes are located on opposite sides of the first axis.

11. A landing gear as claimed in claim 10 including a shock absorbing means mounted between said aircraft structure and a point of said support at a distance from said first axis, and a shock absorbing means mounted in said legs.

12. A landing gear as claimed in claim 3 wherein each of said actuating means includes a hydraulic motor pivoted both to said support and to one of said legs.

13. A landing gear as claimed in claim 12 including a locking means for locking the legs in the said downwardly extended position.

14. A landing gear as claimed in claim 13 wherein said locking means includes said hydraulic motor which forms said actuating means.

References Cited by the Examiner
UNITED STATES PATENTS

| | | | |
|---|---|---|---|
| 2,130,914 | 9/1938 | Warren | 244—104 X |
| 2,755,041 | 7/1956 | Lewis | 244—102 |
| 2,777,652 | 1/1957 | Grundin | 244—102 X |
| 2,826,381 | 3/1958 | Cruz | 244—103 X |
| 3,216,673 | 11/1965 | Alter et al. | 244—36 X |

MILTON BUCHLER, *Primary Examiner.*

FERGUS S. MIDDLETON, *Examiner.*

B. BELKIN, *Assistant Examiner.*